No. 783,366.

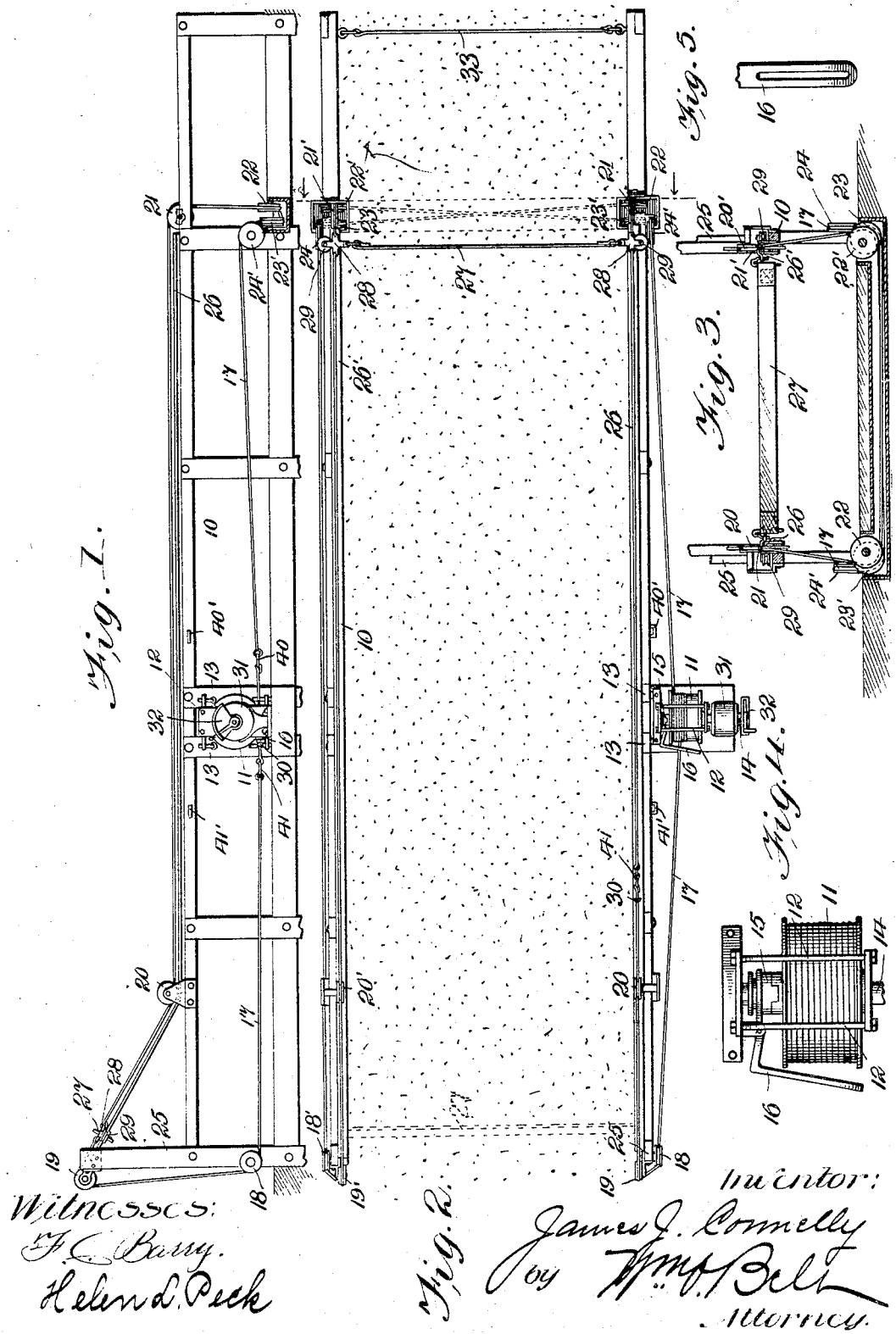

Patented February 21, 1905.

UNITED STATES PATENT OFFICE.

JAMES J. CONNELLY, OF CHICAGO, ILLINOIS.

RACE-STARTER.

SPECIFICATION forming part of Letters Patent No. 783,366, dated February 21, 1905.

Application filed January 30, 1903. Serial No. 141,198.

*To all whom it may concern:*

Be it known that I, JAMES J. CONNELLY, a citizen of the United States, residing at Chicago, in the county of Cook and State of Illinois, have invented certain new and useful Improvements in Race-Starters, of which the following is a specification.

This invention relates to novel improvements in race-starters; and its object is to provide improved means for starting horses in a race, so that they may all be induced to cross the starting-line at or about the same time.

With these and other ends in view the invention contemplates a barrier movable along the track and wholly under the control of the official starter, who may move the barrier forward or backward and at any desired speed.

I have illustrated one way of embodying my invention in the accompanying drawings, in which—

Figure 1 is a side elevation showing my invention. Fig. 2 is a top plan view. Fig. 3 is a sectional view on the line 3 3 of Fig. 2. Fig. 4 is a detail view of the winding-drum. Fig. 5 is a detail view of the shifter-lever.

The operating means of my invention are applied to the fences 10, bordering the track, and comprise a drum 11, supported in a frame 12 of any suitable character, which is movably secured to posts 13 of one fence. This drum is mounted loosely on a shaft 14 and is adapted to be locked therewith by means of a clutch 15, which is operated by a shifter-lever 16, Fig. 4. An endless rope 17 is wound around the drum and carries the barrier 27 back and forth over the track. This rope travels from the drum forwardly around the lower pulley 18, up and over the pulley 19, back under the pulley 20, to and over the pulley 21, down and under the pulley 22, Fig. 1, beneath the track, as shown in dotted lines in Fig. 2 and in full lines in Fig. 3, to and over the pulleys 23 and 24, Fig. 3, forward around pulley 18', up and over pulley 19', back and under pulley 20', to and over pulley 21', down around pulley 22', Fig. 3, underneath the track, Figs. 2, 3, and over pulleys 23' 24', back to the drum, Fig. 1. The pulleys 20 20' 21 21' are located on the fence and the pulleys 19 19' are located at the top of posts 25, which are of sufficient height to permit the horses and riders to pass under the barrier when at the forward limit of its movement adjacent to the pulleys 19 19'.

On the top of the fences are guides 26 26', which may be made of angle-iron or channel-iron or in any other suitable manner. These guides are inclined upward from the pulleys 20 21' to the pulleys 19 19', as shown in Fig. 1, and are provided with flanges directed horizontally away from the track. The barrier 27 is made, preferably, of fabric material and stretched comparatively taut across the track; but its inherent flexibility will be sufficient to prevent injury to the horses or their riders if they run against or come in contact therewith. The barrier is connected in any suitable manner at its ends with carriers 28, to which the rope 17 is attached and which are provided with horizontal grooved rollers 29, arranged to travel on the outwardly-directed flanges of the guides. The rope travels through the slotted clutch-shifter and is provided with a button 30, which is too large to pass through the shifter and engages and operates the shifter to open the clutch, and thus stop the movement of the drum and cord at the time the barrier reaches a position at the top of the post 25, as shown in Fig. 1 and indicated in dotted lines in Fig. 2. This operation is automatic, and while the barrier may be carried down the track at great speed it will nevertheless be instantly stopped when it reaches its elevated position out of the way of the horses.

I may operate the drum by any suitable means, but I prefer to use a motor 31 and a starting-box 32, whereby the barrier can be moved back and forth and at greater or less speed. I may also employ a rear barrier 33, which can be stretched and supported across the track in any suitable manner and removed after the race has started. This rear barrier will be located at sufficient distance to give the horses plenty of room to move around and at the same time it will confine them within a limited area, so that they cannot become widely separated, and thus delay the start.

The horses are wholly under the control of the official starter and at the proper time he will start the drum to revolving and move the barrier down the track. This barrier, as before stated, can be moved by the starter in any desired manner, forward or backward, slowly or rapidly. At the proper time, which will depend upon the judgment of the starter, he will cause the barrier to move forward down the track and as the horses and jockeys see the barrier moving they will start to follow. The barrier can then be moved faster and faster, and when the horses have lined up across the track the starter may suddenly throw the barrier forward, up the incline and out of the way of the horses, so that their progress will be unimpeded. One of the principal features of the invention is the fact that the starter may move the barrier back and forth to coax the horses into position for a proper start, and this can be done by a skilful starter in a way which will save much time and worry.

To avoid the necessity of duplicating my entire apparatus at each starting-point on a track, I make the motor, drum, and clutch mechanism detachable from the fence, so that they can be transferred to another starting-point, leaving the rest of the apparatus in place. The rope can be unfastened at 40 and 41, leaving on the drum the windings thereon, and the free ends of the rope can be connected to the hooks 40' 41' on the fence.

Without limiting myself to the exact construction and arrangement of parts herein shown and described, what I claim, and desire to secure by Letters Patent, is—

1. A race-starter comprising a barrier stretched across the track, means for guiding the barrier along the sides of the track, an endless rope traveling a limited distance on each side of the track and connected with each end of the barrier, a drum on which said rope is partly wound, a motor, a clutch for connecting the drum and motor, a clutch-shifter, and a device carried by the rope for operating said clutch-shifter to open the clutch.

2. A race-starter comprising a barrier stretched across the track, guides on each side of the track upwardly inclined at their forward ends, carriers connected to the ends of the barrier and provided with rollers arranged to travel on the outer edges of the guides in direct alinement with the barrier, an endless rope traveling a limited distance on each side of the track and connected with each of said carriers, a drum on which said rope is partly wound, an electric motor for operating the drum, a starting-box for controlling the operation of the drum, and means for automatically stopping the drum when the barrier has reached the forward limit of its movement.

JAMES J. CONNELLY.

Witnesses:
  Wm. O. Belt,
  Helen L. Peck.